United States Patent [19]

Magenheim et al.

[11] Patent Number: 4,470,123
[45] Date of Patent: Sep. 4, 1984

[54] MICROWAVE ICE ACCRETION METER

[75] Inventors: Bertram Magenheim, Bethesda, Md.; James K. Rocks, McLean, Va.

[73] Assignee: Miami R & D Limited Partnership, Bethesda, Md.

[21] Appl. No.: 337,200

[22] Filed: Jan. 5, 1982

[51] Int. Cl.$^3$ ............................................. G01B 13/04
[52] U.S. Cl. ............................... 364/563; 244/134 D; 324/58.5 R; 340/580
[58] Field of Search ........................ 364/563, 424, 484; 73/170 R; 244/134 R, 134 D, 134 F; 324/58 R, 58.5 R, 58.5 B; 333/240; 340/580, 582

[56] References Cited

U.S. PATENT DOCUMENTS

| | | | |
|---|---|---|---|
| 2,800,647 | 7/1957 | Baerwald et al. | 340/582 |
| 3,240,054 | 3/1966 | Roth | 340/582 |
| 3,270,330 | 8/1966 | Weinberg | 340/582 |
| 3,836,846 | 9/1974 | Overall et al. | 340/580 |
| 3,940,622 | 2/1976 | Stallabrass et al. | 250/338 |
| 4,054,255 | 10/1977 | Magenheim | 340/580 |
| 4,060,212 | 11/1977 | Magenheim | 340/580 |
| 4,095,456 | 6/1978 | Edgington | 244/134 F |
| 4,176,524 | 12/1979 | Kamiyama et al. | 340/582 |
| 4,365,131 | 12/1982 | Hansman, Jr. | 244/134 D |

Primary Examiner—Errol A. Krass
Attorney, Agent, or Firm—Pollock, Vande Sande and Priddy

[57] ABSTRACT

A system for indicating ice thickness and rate of ice thickness growth on surfaces is disclosed. The region to be monitored for ice accretion is provided with a resonant surface waveguide which is mounted flush, below the surface being monitored. A controlled oscillator provides microwave energy via a feed point at a controllable frequency. A detector is coupled to the surface waveguide and is responsive to electrical energy. A measuring device indicates the frequency deviation of the controlled oscillator from a quiescent frequency. A control means is provided to control the frequency of oscillation of the controlled oscillator. In a first, open-loop embodiment, the control means is a shaft operated by an operator. In a second, closed-loop embodiment, the control means is a processor which effects automatic control.

8 Claims, 14 Drawing Figures

MICROWAVE ICE ACCRETION METER

GOVERNMENT CONTRACT

The invention described herein was made in the performance of work under NASA Contract No. NAS3-22765 and is subject to the provisions of Section 305 of the National Aeronautics and Space Act of 1958 (72 Stat. 435; 42 USC 2457).

DESCRIPTION

1. Technical Field

The present invention relates to an apparatus for indicating ice thickness and rate of ice thickness growth on surfaces which may be subject to ice accretion as a result of weather conditions. The invention finds particular utility in the avionics field for detecting and measuring ice thickness and rate of ice growth on air foil surfaces.

2. Background Art

The problems caused by icing, particularly in the avionics field, and some solutions to those problems heretofore provided by the prior art are summarized in my prior U.S. Pat. Nos. 4,054,255 entitled "Microwave Ice Detector" and 4,060,212 entitled "De-Icing Apparatus and Method". The research which led to the inventions described in the above-mentioned patents is more thoroughly discussed in "Demonstration of the Microwave Ice Protection Concept", a report prepared for the Applied Technology Laboratory, U.S. Army Research and Technology Laboratories (USAAMRDL-TR-77-34) dated May 1978, and prepared under contract DAAJO2-76-C-052. While that research was primarily directed to an alternative to pneumatic and resistance heated air foil de-icers, it did report on resonant effects in a waveguide apparently caused by ice accretion.

The ice detector described in the '255 patent included a surface waveguide mounted adjacent on air foil in which ice accretion could be expected. Microwave energy was coupled to the surface waveguide via a dual directional coupler, and energy reflected back from the waveguide was monitored. Ice accretion, across the surface of the waveguide, changed the physical reflection coefficient of the waveguide, and this could be detected by comparing the energy input to the waveguide and the energy reflected therefrom, in the dual directional coupler. In the course of that research I noted that ice accretion apparently changed the resonant frequency of the waveguide, and ice detectors postulated in the cited report were based on this principle.

Since that time I have discovered that a device can be constucted for detection of icing, measuring ice thickness and detecting the rate of ice growth, by a device which is different from that described in either the '255 patent or the cited report.

More particularly, in a first embodiment of the invention the region to be monitored for ice accretion is provided with a resonant surface waveguide (or trough line). The waveguide is mounted flush, below the surface being monitored. Since it is non-intrusive it does not disturb air flow and thus may be located adjacent any air foil surface. Microwave energy is coupled to the waveguide. The microwave energy is coupled via a feed point. A controlled oscillator provides the microwave energy at a controllable frequency. A detector is coupled to the surface waveguide at a point displaced from the feed point and is responsive to electrical energy incident on the detector. A measurement device is coupled to the controlled oscillator for indicating the frequency deviation of the controlled oscillator from a quiescent frequency, and finally control means are provided to control the frequency of oscillation of the controlled oscillator. In a first or open loop embodiment of the invention, an operator can operate a control means to vary the frequency of controlled oscillations and monitor the output of the detector, which may for example comprise a meter. The quiescent frequency is selected as the waveguide resonant frequency in the absence of ice. As ice accumulates the waveguide resonant frequency changes. The actual resonant frequency of the waveguide/ice combination is determined by adjusting the frequency of the controllable oscillator until the meter reads a maximum. Deviations of the controlled oscillator frequency, from the quiescent frequency, indicate the presence of ice, and the quantum of this deviation indicates the thickness of the ice. By calibrating the measurement device, ice thickness can be determined directly from the meausrement device.

If desired the measurement device can be augmented by the addition of a rate determining apparatus to indicate the rate of change of the frequency at which the detecting device indicates a peak. The output of the rate indicating circuit will therefore indicate rate of ice growth.

Accordingly, in an open loop embodiment the invention provides:

and ice detection and thickness measurement system comprising:

a controlled oscillator, oscillating at a controllable microwave frequency, a resonant surface waveguide coupled to said controlled oscillator at a feed point, means to mount said waveguide in a location subject to ice accretion, detector means coupled to said surface waveguide at a point displaced from said feed point responsive to microwave electrical energy incident on said detector means, said detector means providing an output indicating microwave electrical energy incident thereon, measurement means coupled to said controlled oscillator for indicating frequency deviations of said controlled oscillator from a predetermined frequency, and control means to control the frequency of oscillations of said controlled oscillator, whereby ice thickness is detected by noting said frequency deviation indicated by said measurement means when said control means controls said frequency of oscillation to produce a maximum detected energy at said detector means.

In a second, or closed loop embodiment of the invention, a feedback device is arranged to couple the detector means to the control means. The feedback device is arranged to note for example a drop in detected energy by the detector means caused as a result of ice growth. This change in the output of the detector means produces a signal from the feedback means to drive the control means in such a fashion as to change the frequency of oscillations of said controlled oscillator in a search mode to relocate that frequency which produces a maximum output of the detector. When the controlled oscillator has its frequency of oscillation changed to again produce a peak out of the detector means, the feedback means terminates driving of the controlled oscillator. The frequency deviation through which the controlled oscillator is moved from a quiescent frequency is indicative of the ice thickness. Similar to the first or open loop embodiment of the invention, the measurement means can be augmented with a rate determining circuit (and including a meter to indicate the output of the rate determining circuit) so that the augmented measuring means indicates not only ice thickness, but rate of ice growth as well.

Accordingly, in a second or closed loop embodiment the invention includes the apparatus recited above wherein the control means includes:

feedback means responsive to said detector means for varying said frequency of oscillation to automatically determine a frequency of oscillation producing a maximum output in said detector means.

In contrast to the prior art cited above, and known to the applicant, the surface waveguide used in the invention is employed in a transmission mode in that energy is coupled from a feedpoint to a detector, which is spaced therefrom, rather than in the reflection mode as expressed in the cited prior art. My experiments indicates that the s/n ratio of the reflection mode is so poor as to render any measurement almost useless whereas in the transmission mode the s/n ratio is good to excellent.

In a preferred embodiment of the invention, one which for example can be employed in an operating aircraft such as a helicopter, to monitor ice thickness and rate of ice growth on the helicopter rotor blades, the feedback means is implemented in the form of a digital processor, for example one of the commonly available microprocessors now available off the shelf. The digital processor is provided with a program to enable it to sense detector output, via an analog-to-digital converter, on sensing a deviation of that detector output indicative of a change in ice thickness, to output a signal to a controlled oscillator to vary the frequency of oscillation thereof. By controlling the output of the feedback means as a function of the output of the detector means (using one of several conventionally known search strategies) the digital processor rapidly achieves a condition in which the detector output is maximized (to any given precision desired). The measurement means referred to above may take the form of analog or digital displays driven by the digital processor to indicate to an observer both ice thickness and rate of ice growth. Because of the speed with which the processor operates, the observer perceives, essentially in real time, information on the displays.

Accordingly, the preferred embodiment includes two major components, the transducer comprising controlled oscillator, resonant surface waveguide and detector and the digital subsystem comprising processor with display output, an A/D converter coupling detector to processor and a D/A converter coupling processor to controlled oscillator. The transducer can be miniaturized using IC's to exhibit negligible mass. This and the fact that the waveguide is non-intrusive allows the transducer to be located near an air foil surface, even for example, a helicopter blade or engine inlet. If desired the processor can provide a print out of ice thickness and accretion rate vs. time. The processor can also store ice thickness and accretion rate in memory for later statistical analysis in ice or cloud studies.

In the embodiments of the invention described above, only a single waveguide or transducer has been referred to. In some applications it may be necessary and/or desirable to monitor ice at a plurality of locations within a single aircraft, vehicle or other structure. These needs are met by the use of several waveguides or transducers, each located according to the need and/or desire for monitoring ice at a variety of locations. The remaining apparatus, i.e. the controlled oscillator, detector means, measurement means and control means can be duplicated for each different waveguide or, can be time shared over a plurality of waveguides. Similarly, the second or closed loop embodiment of the invention can be modified by providing plural waveguides and time sharing some or all of the controlled oscillator, detector means, measurement means, control means and feedback means. In a preferred form of the multi-waveguide embodiment of the invention, however, each of the waveguides is part of a dedicated transducer with a single processor (implementing control and feedback means) time shared among all transducers.

BRIEF DESCRIPTION OF THE DRAWINGS

The present invention will now be further described in the following portions of the specification when taken in conjunction with the attached drawings in which like reference characters identify identical apparatus and in which.

DETAILED DESCRIPTION OF PREFERRED EMBODIMENTS

Figure 1:
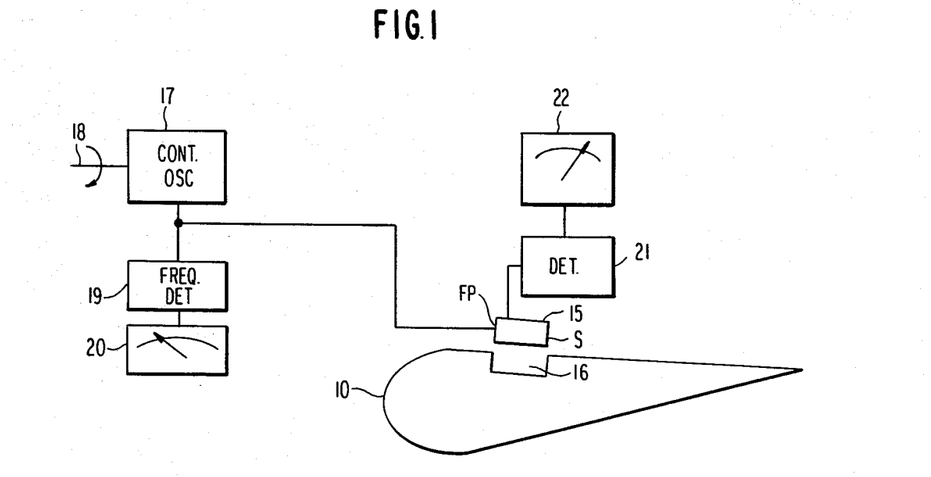
FIG. 1 is a functional block diagram of an open loop embodiment of the invention.

FIG. 1 is a functional block diagram of an open loop embodiment of the invention which is employed for ice detection and measurement in connection with an air foil 10. As shown in FIG. 1, the air foil 10 includes a surface waveguide 15, which when inserted into the mating slot 16 in the air foil 10 exhibits a streamline structure. The surface waveguide 15 is shown in more detail in FIG. 3, at this point it suffices to note that the waveguide 15 includes a feed point (FP) which is supplied with microwave energy by a controlled oscillator 17. The controlled oscillator 17 is associated with a control means 18 for varying the frequency of oscillation thereof. The controlled oscillator 17 is arranged to oscillate at a predetermined, fixed or quiescent frequency $F_0$ and at other times at a frequency of oscillation which is different from $F_0$ as controlled by the manipulated shaft 18. The frequency of oscillation of the controlled oscillator 17 is detected by a frequency detector 19 which has an input coupled to the output of the controlled oscillator 17, and an output coupled to a conventional meter or other frequency indicating device 20. In a preferred embodiment, the meter 20 is arranged to indicate deviations in the frequency of the controlled oscillator 17 from the frequency $F_0$. As will be more clearly explained in subsequent portions of this specification, the meter 20 may be calibrated in terms of ice thickness.

Also associated with the waveguide 15 is a detector 21. As is indicated in FIG. 1, the detector 21 is coupled to the waveguide 15 at a point separated from the feed point FP, and thus the waveguide 15 operates in a transmission mode in that energy detected by the detector 21 is energy which is transmitted through the waveguide 15. The waveguide 15 is shorted, such as by the use of the short S, also indicated in FIG. 1. The waveguide 15 is arranged to be resonant at the frequency $F_0$ when mated with the air foil 10. To present a streamlined appearance the waveguides 15 includes an air foil surface to mate with the air foil 10. The detector 21 is coupled to another conventional display such as the meter 22. The meter 22 is deflected in relation to the energy detected by the detector 21.

In normal operation, with the waveguide 15 installed in the air foil 10, the controlled oscillator produces an output at the quiescent frequency of oscillation $F_0$ which is coupled to the waveguide 15. The energy is detected by the detector 21 and indicated by the meter 22. In the event that ice forms on the surface of the surface waveguide 15, the electrical characteristics of the waveguide changes, and more particularly its resonant frequency changes. As a result, in the absence of a change in the frequency of oscillation of the controlled oscillator 17, the waveguide 15 no longer receives energy at its resonant frequency. In this off resonant condition, the energy intercepted by the detector 21 decreases, and the meter 22 reflects this condition.

An observer, observing the drop in the reading of the meter 22 can manipulate the shaft 18 to lower the frequency of the controlled oscillator 17. Lowering the frequency of the controlled oscillator increases the wave length of the energy in the waveguide 15, to compensate for the change in electrical characteristics caused by the ice accretion on the surface of the waveguide 15. As the frequency of the controlled oscillator 17 approaches the new resonant frequency of the waveguide 15, the energy incident on the detector 21 increases and the meter 22 reflects this fact. As the frequency oscillation passes beyond the resonant frequency of the waveguide 15, the energy intercepted by the detector 21 again falls, reflected by movement of the needle on the meter 22. The observer can then, by reversing the rotation of the shaft 18, bring the meter 22 to a maximum. During this manipulation of the shaft 18, the frequency detector 19 is continually detecting frequency deviations from the frequency $F_0$. Once the meter 22 has again been placed in a maximum condition, the observer can note the condition of the meter 20 indicating the frequency deviation ($F_0-F$), preferably with the meter 20 calibrated for the dimensions of the waveguide 15 and the frequency $F_0$, the ice thickness can be read directly off the meter 20.

Figure 2:
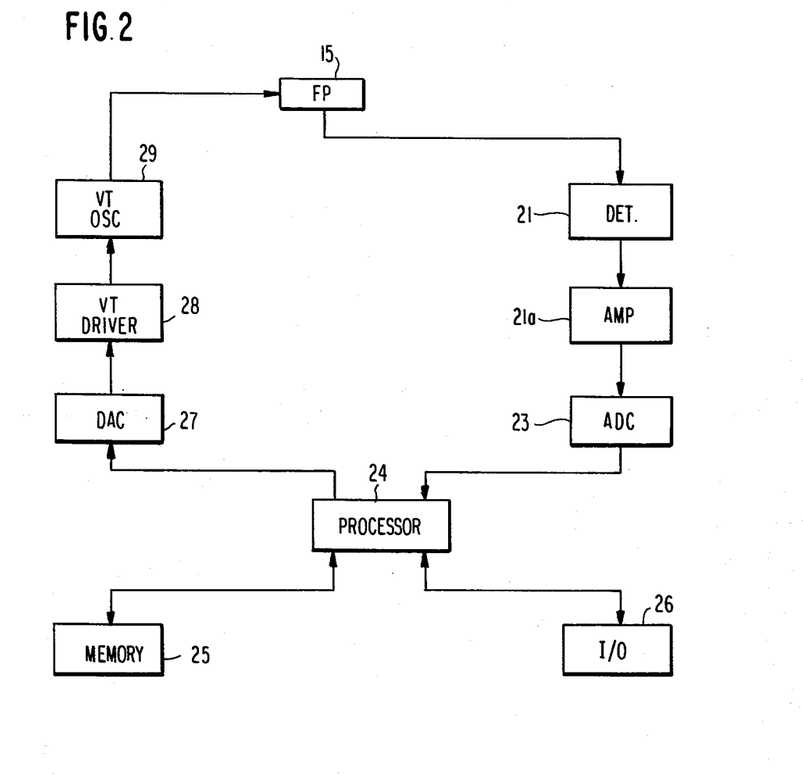
FIG. 2 is a functional block diagram of a closed loop embodiment of the invention.

FIG. 2 is a block diagram of a closed loop embodiment of the invention; the illustration of FIG. 2 omits the illustration of the air foil 10. As shown in FIG. 2, the waveguide 15 is driven from a VTO 29 (which replaces the controlled oscillator 17) and is coupled to a detector 21 at a point spaced from the feed point FP. The output of the detector 21, amplified in amplifier 21a is coupled to an analog-to-digital converter (ADC) 23. The output of the ADC 23 is provided as an input to a processor 24 which is also coupled to associated memory 25 and I/O devices 26. Processor 24 provides an output to a digital-to-analog converter (DAC) 27 which in turn provides a voltage to a VT driver 28. The VT driver 28 (or amplifier) provides an input voltage to the VTO 29 which thus produces an output frequency indicative of this input voltage.

A comparison of FIGS. 1 and 2 indicates that a feedback device (the processor 24 and its ancillary equipment) has been coupled between the detector 21 and the controlled oscillator (in the form of the VTO 29). In addition, the meter 20 has now been replaced by I/O device 26 which can include for example conventional digital panel meters or the like. Because of the feedback provided by the processor 24, the need for the meter 22 has been obviated, although if desired the I/O device 26 may include a read out corresponding to the meter 22.

While the processor 24 can be provided with a host of functions in the form of software or firmware via the memory 25 (which may include ROM) the basic function of the processor 24 is to interpret variations in the output of ADC 23 (indicative of alterations in the output of the detector 21) and drive the DAC 27 in such a fashion as to produce a maximum or near-maximum output of the detector 21. The frequency deviation of the VTO 29 which is required to bring the detector 21 to a maximum or near-maximum condition is indicative of the ice accretion. When this condition is reached, the processor 24 can then interpret the digital output producing this condition as indicative of ice accretion or growth. Likewise, the processor 24 can also derive a time rate of change of ice thickness and output this (through another one of the I/O devices 26) indication. The memory 25, in addition to providing the software or firmware for operation of the processor 24 can also provide for temporary storage of intermediate results in RAM. While the use of digital panel meters or the like has been indicated, the I/O devices 26 may also include other conventional output devices such as printers, CRT's and the like.

Of course, since none of the apparatus shown in either FIG. 1 or FIG. 2 actually measures ice thickness per se, accuracy of the device depends upon the ability to predict the relation between frequency deviations of the controlled oscillator 17 or VTO 29 in relation to actual ice thickness. This in turn is determined by the dimensions of the waveguide 15, the material of which it is constructed, the relative locations of the feedpoint and the detector coupling, and the quiescent frequency ($F_0$) of the controlled oscillator. In addition, the speed with which the embodiment of FIG. 2 can accurately locate a new resonant frequency is determined in part by the software or firmware which directs the processor's search for this resonant frequency. Preferred embodiments illustrating the factors which effect the foregoing parameters will now be described.

Figure 3:
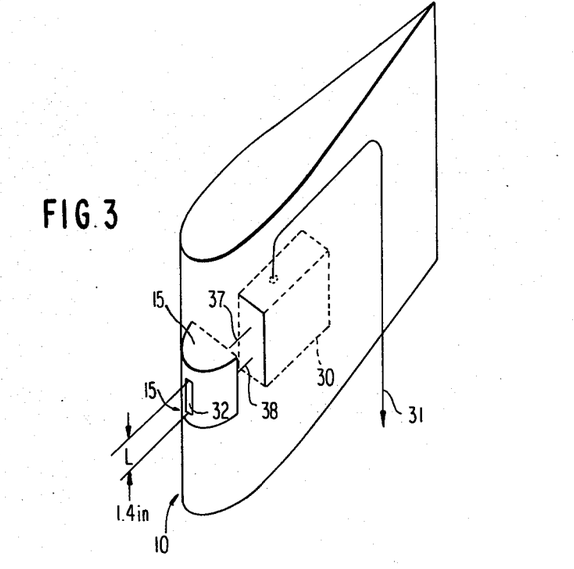
FIG. 3 is an isometric illustrating a transducer, including waveguide, located near the surface of an air foil.

FIG. 3 is an isometric view of a section of a typical air foil 10 within which a transducer is installed. As shown in FIG. 3, the waveguide 15 has a surface which generally conforms to the contours of the air foil 10, and is actually mounted beneath the surface of the air foil 10.

The waveguide 15 is responsive to ice accumulations within the region defined by the uppermost surface 32 of the waveguide 15. The surface can be protected by a polyurethane or polyethylene erosion shield, having a dielectric constant similar to the dielectric constant of the surface waveguide itself. Also shown in FIG. 3 is the housing 30 for the remainder of the components of the transducer, i.e. the oscillator 29, detector 21 and the associated amplifiers 28 and 21a. The equipment in housing 30 is coupled to the processor over a multi-conductor cable 31. FIG. 3 also indicates that waveguide 15 is coupled to the housing 30 by a pair of coaxial conductors, i.e. coaxial conductors 37 and 38. One of these conductors couples the VT 29 to the waveguide 15, and the other couples the waveguide 15 to the detector 21. The housing 30 and the components it contains can be miniaturized considerably by the use of microwave integrated circuits (MIC).

Figure 4A:
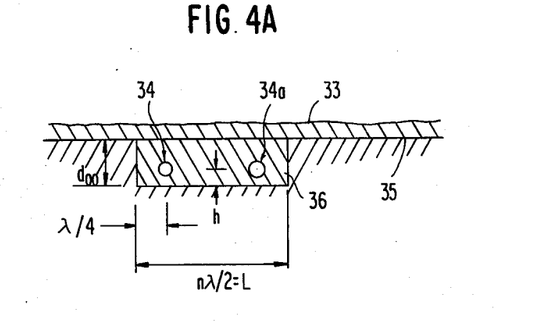
FIGS. 4A and 4B are a section through the air foil at the location of the waveguide and a top view of the waveguide.
Figure 4B:
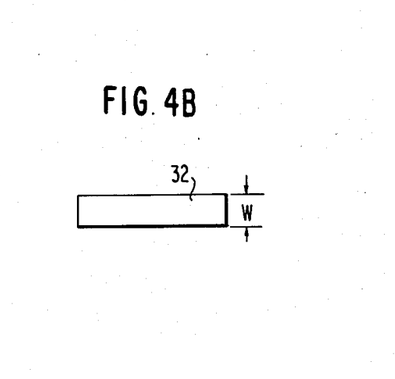

FIG. 4A is a cross-section of the waveguide 15 and FIG. 4B is a top view. As shown in FIG. 4A, 35 represents the surface of an air foil 10, and 33 indicates ice accretion above the surface of the air foil 10. The waveguide 15 itself is composed of a stable dielectric material such as polyethylene which has approximately the same dielectric constant as ice. In the ice-free condition, the surface waveguide 15 is made resonant by assuring that its length is equal to a multiple number of half wavelengths of the quiescent frequency of VTO 29. Thus, as shown in FIG. 4A, the length of the waveguide is an integral number of half wavelengths. FIG. 4A also indicates the location of the coupling 34, coupling the VTO 29 to the wavelength 15; more particularly it is $\frac{1}{4}$ wavelength from an end wall. FIG. 4A also shows the detector probe 34a which is coupled to the waveguide $\frac{1}{4}$ wavelength from the opposite end wall. Since this dimension is independent of ice thickness and frequency (guide wavelength in a resonant surface waveguide is constant) there is no variation in coupling due to this location. I have found that very light coupling is desirable so a high loaded Q with very little radiation is realized. The probe is coupled to the electric field in the surface waveguide and therefore the coupling efficiency is dependent on the relative strength of the electric field at the location of the probe. The coupling is obviously zero at frequencies below cutoff of the surface waveguide and starts to rise as the operating frequency is increased above cutoff. Trying to operate the transducer at frequencies only slightly above cutoff while yielding very high theoretical sensitivity will be impractical because the coupling will be too low. The operating frequency must be sufficiently above cutoff to provide adequate, albeit light coupling. The coupling is also a function of the height of the probe relative to the thickness of the dielectric; i.e. h/d, as seen in FIG. 4A. In the absence of ice, $d=d_{oo}$. Because of the relation between coupling and the ratio h/d, the coupling decreases as ice thickness increases.

In an embodiment which has been constructed, VTO 29 tuned in the range 5.9 to 6.57 gigahertz; the length L was 1.393 inches, the depth ($d_{oo}$) was 0.787 inches and the width W was 0.25 inches. The surface waveguide of these dimensions has a resonant frequency of 6.28 gigahertz.

Figure 7A:
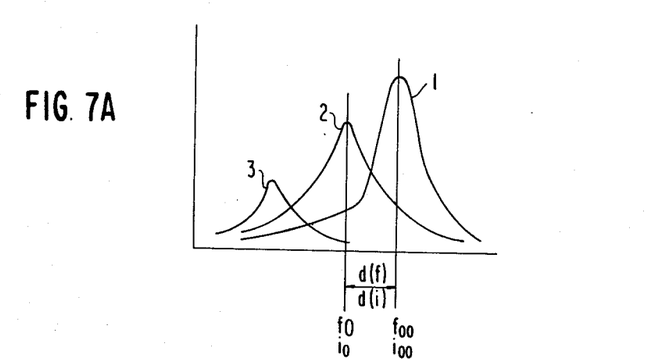
FIGS. 7A and 7B are plots of detector output vs. frequency showing changes in resonant frequency due to ice accretion.

FIG. 7A illustrates the change in resonant frequency of the waveguide due to increasing layers of ice. For example curve 1 indicates a resonant frequency ($f_{oo}$ at a frequency index $i_{oo}$) in the absence of ice. As ice accretes, the resonant frequency changes to the conditions shown in curve 2 (the new resonant frequency $f_o$ at a frequency index $i_o$). The change in frequency or frequency index df or di is a measure of the ice accretion. Curve 3 indicates a still further change in resonant frequency due to further ice accretion.

Theoretically we could write $I = 1/k \ln(1 - df/df_a)$, where:

df = shift in resonant frequency with ice;
$df_a$ = asymptote of shift in resonant frequency with ice;
k = constant; and
I = ice thickness.

However, I have found it more practical to use the relation $I = 1/k' \ln(1 - di/di_a)$, where:

di = shift in frequency index with ice;
$di_a$ = asymptote of shift in resonant frequency with ice; and
k' = constant.

In the second equation, frequency index (i) replaces frequency (f) where frequency index is a digital count, a different digital count corresponding to each different frequency so that a measurement of the change in frequency index (di) is equivalent to a measure to change in frequency (df). In an embodiment which has been constructed, the processor generated counts in a range (1 to 2047) corresponding to the frequency range of interest. Each count was representative of a different frequency which could be generated by VTO 29. Thus, when a maximum response from the waveguide was determined the count (or frequency index) could be directly related to ice thickness. It should be apparent that this eliminates the necessity to actually measure frequency of VTO 29. It should be understood, however, that it is within the scope of the invention to first vary the frequency of VTO 29 to determine the maximum response of the waveguide (the resonant frequency) and then measure the frequency to determine ice thickness. The calibration process is one of determining the values of K' and $di_a$.

Figure 8:
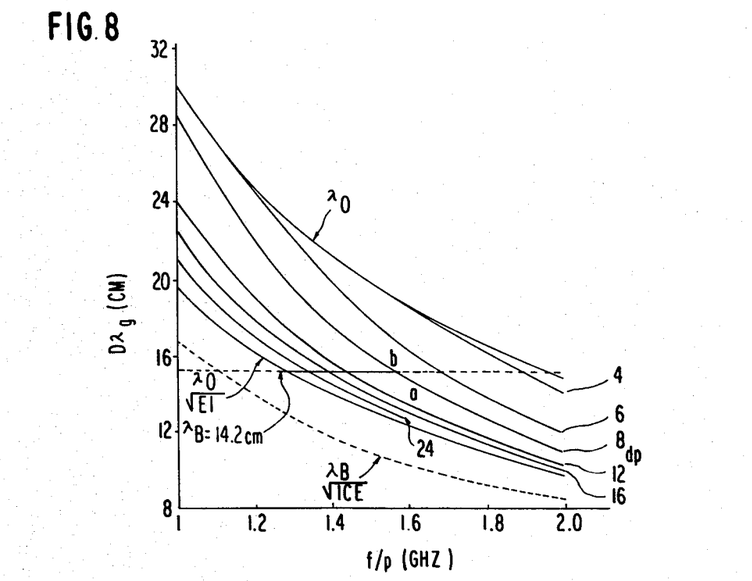
FIG. 8 is a plot of resonant guide wavelength vs. frequency in an embodiment of the invention actually constructed.

The properties of a polyethylene surface waveguide may be established from a plot of guide wavelength versus frequency for various thicknesses of the surface waveguide as illustrated, in FIG. 8. FIG. 8 shows this relation between 1 and 2 Ghz for the $TE_1$ mode. This is obtained by conventional techniques on a trough line whose dimensions are given above. Similar plots made over other octave bands such as 2 to 4 and 4 to 8 Ghz, etc., reveal that all plots are identical if the scales are related by a normalization factor p so that FIG. 8 may be used to represent any octave band given the normalization factor p.

Referring to FIG. 8, the surface waveguide of thickness d is made resonant by making its length equal to an integral number of half wavelengths. Thus, from FIG. 8 when dp = 8 and f/p = 1.66 Ghz (point "a" FIG. 8), the surface waveguide is resonant when its length p$\lambda$g = 14.2 cm. This is defined here as the quiescent resonant frequency, $f_{oo}$. Of course, guides of different thicknesses could use different $f_{oo}$, and while polyethylene is a preferred guide material, other materials could be used with corresponding changes in $f_{oo}$.

The growth of ice layers, assuming the ice has approximately the same dielectric constant as the base dielectric, has the effect of increasing the thickness d of the surface waveguide. As seen from FIG. 8, this has the effect of decreasing the wavelength for a given frequency and destroying the resonance. The condition of resonance is restored by increasing the wavelength by decreasing the frequeny until the wavelength is one again equal to the guide wavelength that existed in the ice-free condition. The turning process is illustrated in FIG. 8 as the locus of points along the horizontal line of constant λ go.

While a polyethylene waveguide has been used, this technique allows waveguides of different materials to be used. Preferably any other waveguide should have dielectric constants near to that of ice.

Figure 7B:
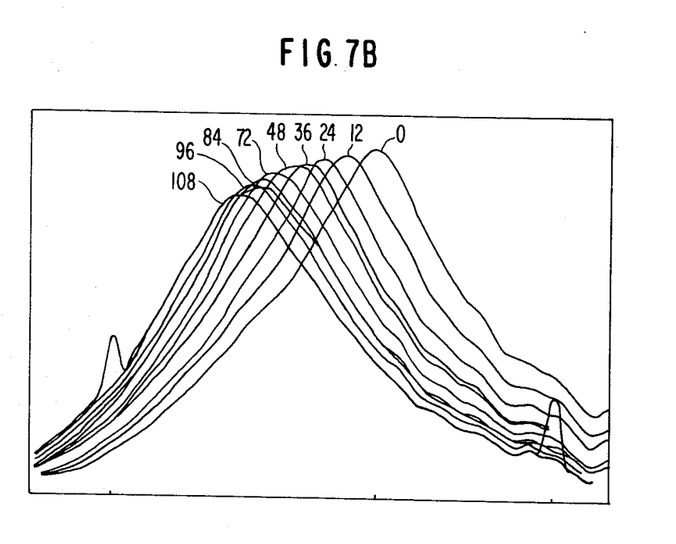

In testing the transducer whose dimensions are given above, changes in ice thickness was simulated by adding layers of polyethylene tape (since the dielectric constant of ice and polyethylene are close to each other). A pen recording, FIG. 7B, was produced to show the shift in resonant frequency for tape thickness of, respectively, 0, 12, 24, 36, 48, 72, 84, 96 and 108 mils. At zero thickness the resonant frequency was 6.29 gigahertz each corresponding change in frequency was 0.05, 0.95, 0.120, 0.142, 0.185, 0.250, 0.227 and 0.253 gigahertz.

Figure 7C:
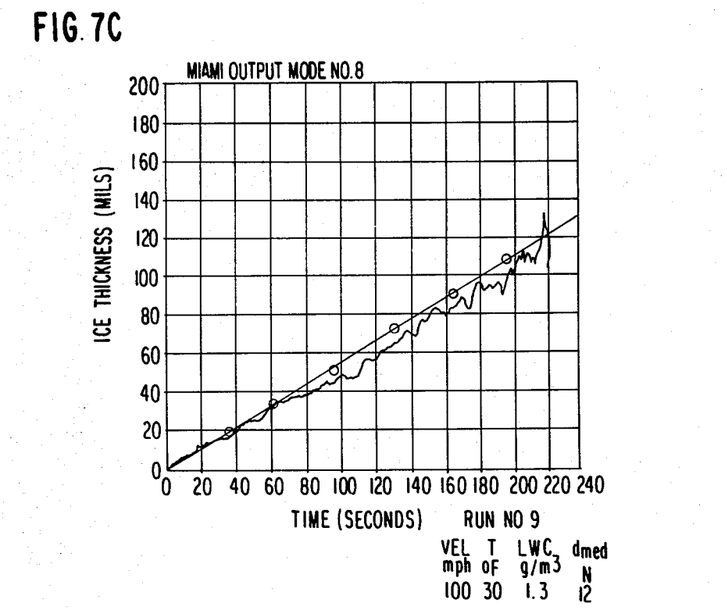
FIG. 7C is a plot of ice thickness vs. time produced by the inventive apparatus.

The curve in FIG. 7C illustrates a real time pen recording of output indications of ice thickness as a function of time produced in accordance with the invention.

Figure 5:
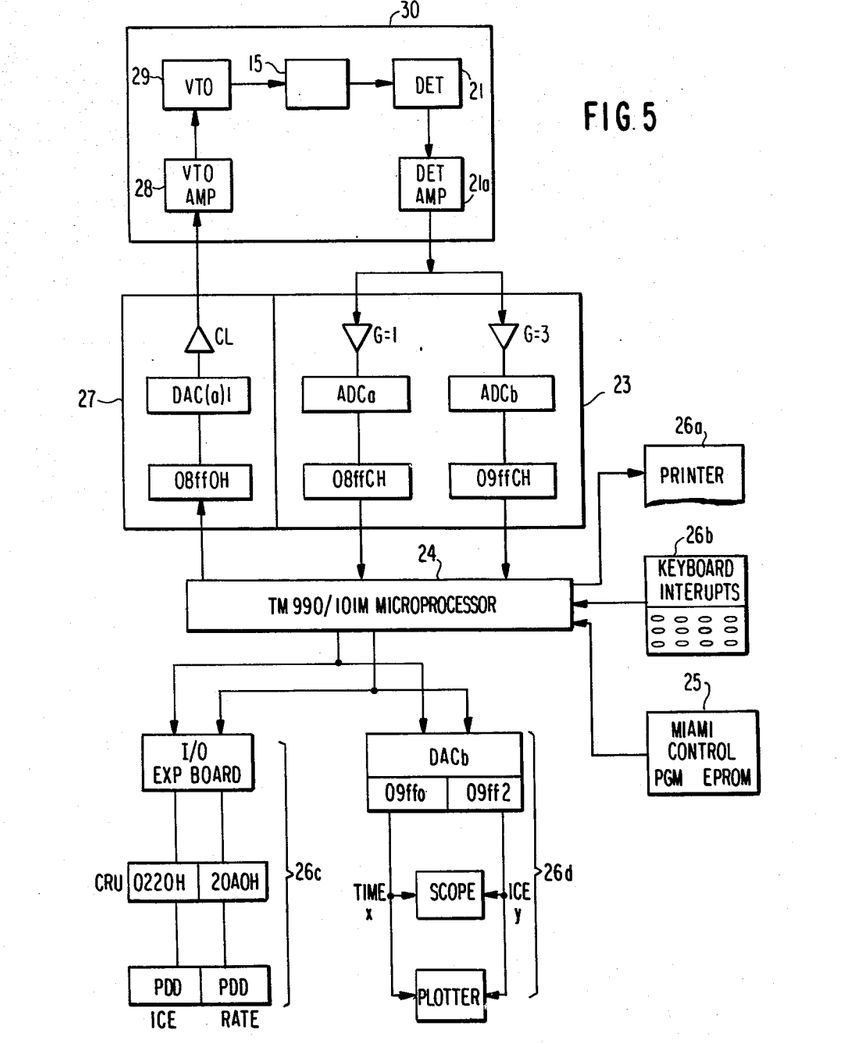
FIG. 5 is a block diagram of an embodiment of the invention which has been constructed.

FIG. 5 is a block diagram of the apparatus which had been constructed to produce the curves shown in FIG. 7C. Shown in FIG. 5 is VTO driver 28 which drives the VTO 29. In the embodiment actually constructed VTO 29 was the Avantek Model 8580 tuning from 5.8 to 6.6 gigahertz. Detector 21 is a crystal detector, its output after amplification at 21a, is input to a two-channel analog-to-digital converter 23; one channel with a gain of one and the other channel with a gain of three. The converted signal output of the transducer in both channels are made available to the microprocessor 24; in the embodiment constructed this was a Texas Instrument Tm990-101M using a TMS9900 16-bit microprocessor and 16K-bytes RAM. Of the apparatus shown in FIG. 5, the printer 26a, keyboard 26b and the digital-to-analog converter, scope and plotter 26d, while useful for development, are not necessary to system opertion. On the other hand, the I/O device 26c representing a TM990/210 input/output expansion board provides a driver for two output ports driving a first panel display device (PDD) displaying ice thickness, and a second panel display device (PDD) displaying rate of ice growth.

In order to operate automatically, once calibrated, the microprocessor drives the D/A output with a particular number representing a frequency index. This is converted first to analog form (by the digital-to-analog converter 27 and the amplifier 28) and then as a voltage is converted to a frequency by the VTO 29. As a result of this particular frequency, the detector 21 detects a particular voltage which is amplified (by the amplifier 21a) and then converted to digital form by the two-channel analog-to-digital converter 23. Depending upon amplitude, one of the two digital signals is selected by the microprocessor. The microprocessor reads this quantity as the response of the transducer to this particular frequency.

The computer then emits another frequency index number and processes the return signal looking for a maximum return signal. When a maximum is found, the index which produced it is the resonant frequency index.

The program which is disclosed below uses ML for resonant frequency index ($i_o$). The quiescent frequency index ($i_{oo}$) is referred to as CA. Thus, the difference $CA-ML=DX$ is the change in frequency index (di) caused by ice accretion. A function of this difference DC is then related to ice thickness.

In any particular scan, when ML is found, it is used by the computer to determine the range of indices J to be presented next, J1 to J2, and the process of searching for the peak between J1 and J2 is repeated. In the embodiment actually constructed, the sampling rate is six thousand frequencies per second. Every one-half second for the first thirty seconds and every second thereafter, at the completion of a sweep, the latest values DX, the time, the ice thickness data, and the amplitude of the peak MX, are stored in an array in computer memory. At the same time, the ice thickness data and accretion rate are converted to decimal and presented to the two panel digital displays.

Figure 6A:
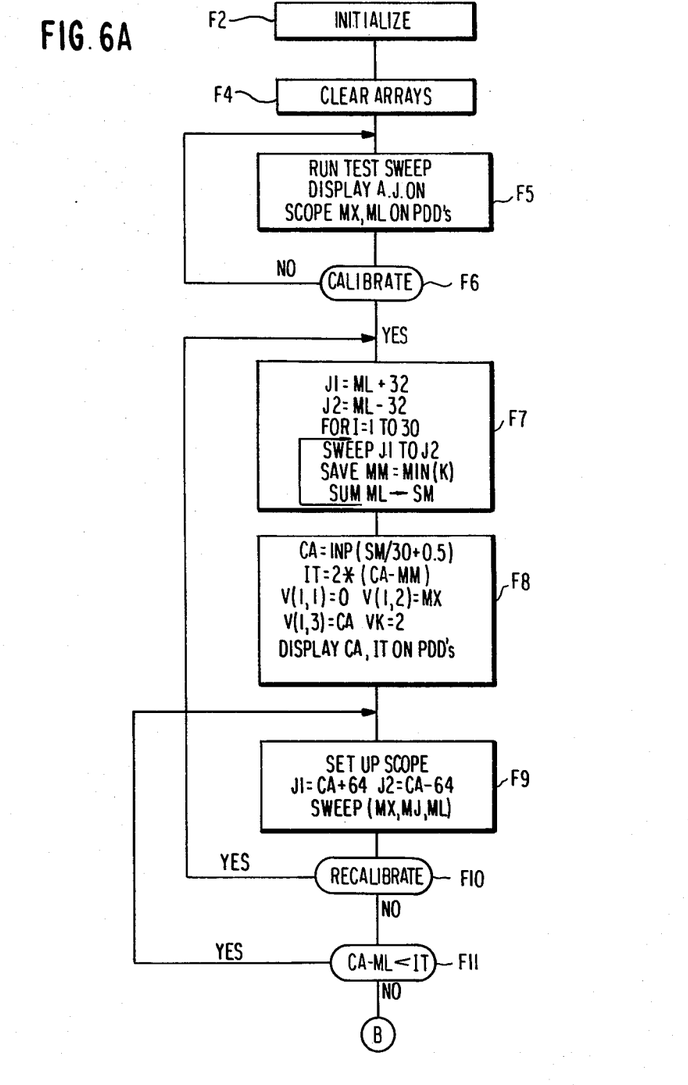
FIGS. 6A-6C is a flow chart of a program for the processor used in the invention.
Figure 6B:
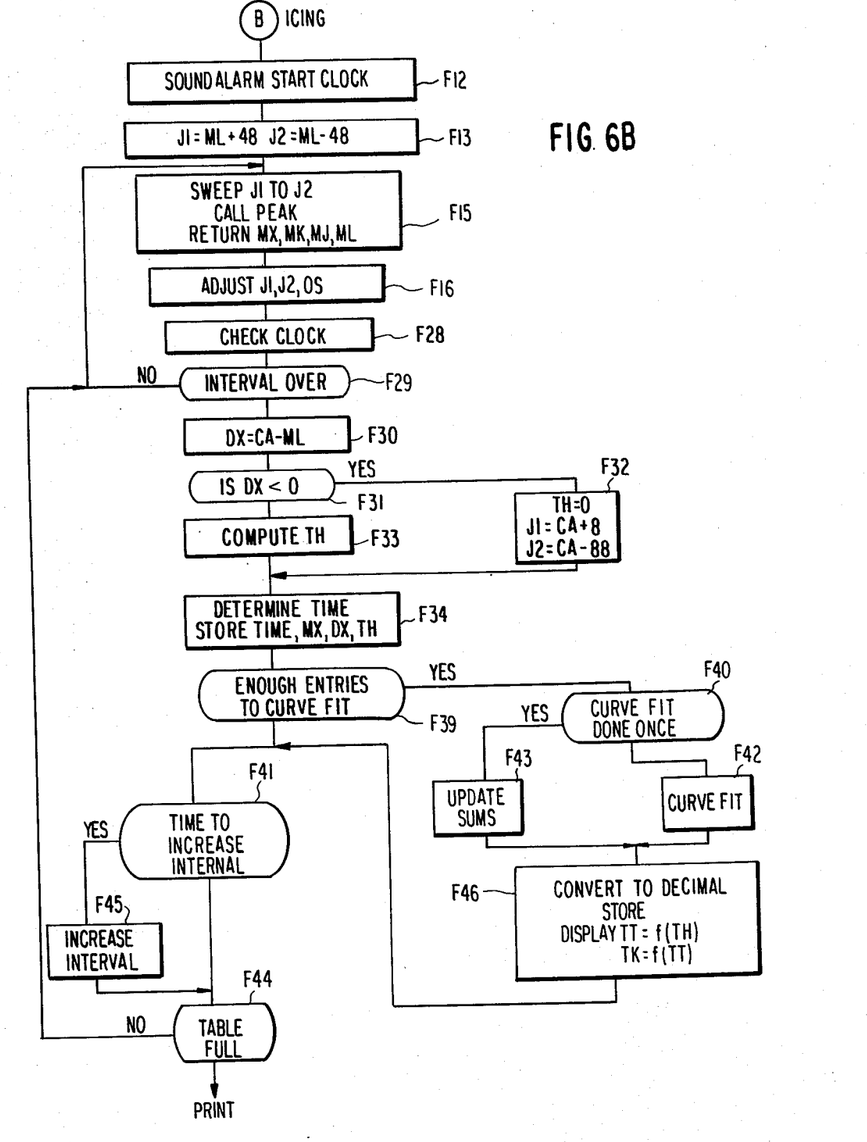
Figure 6C:
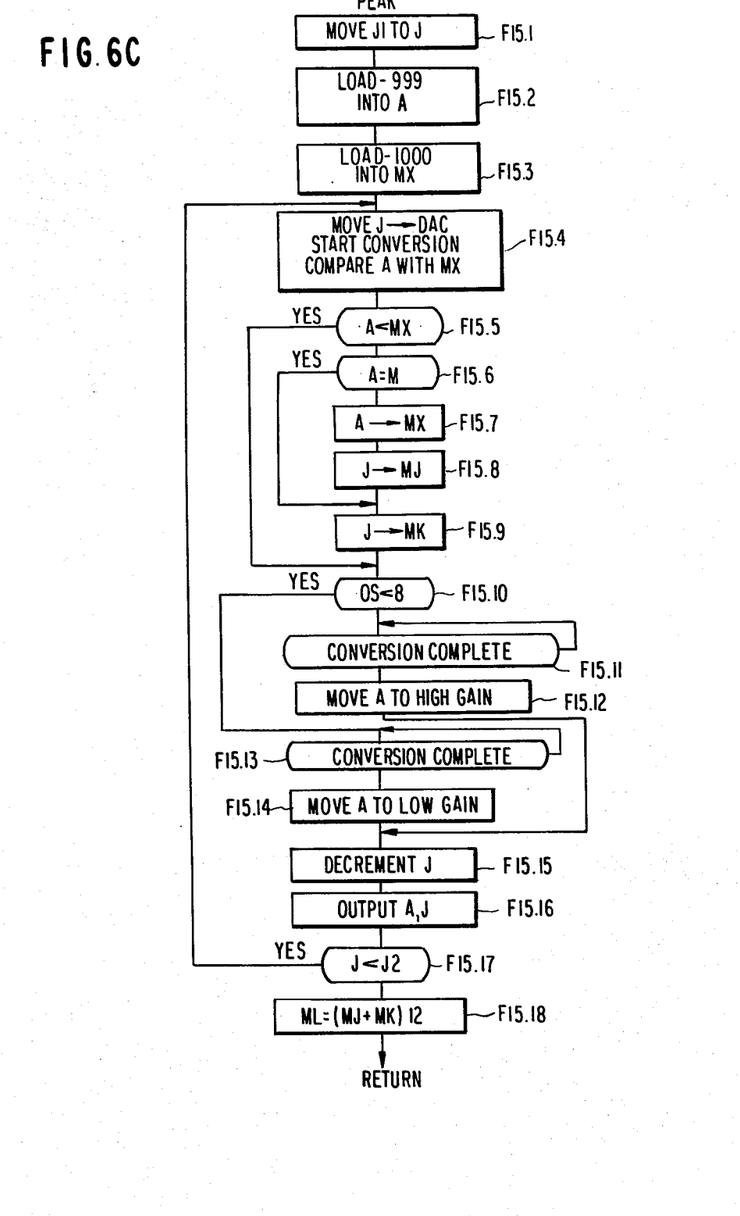
Figure 6D:
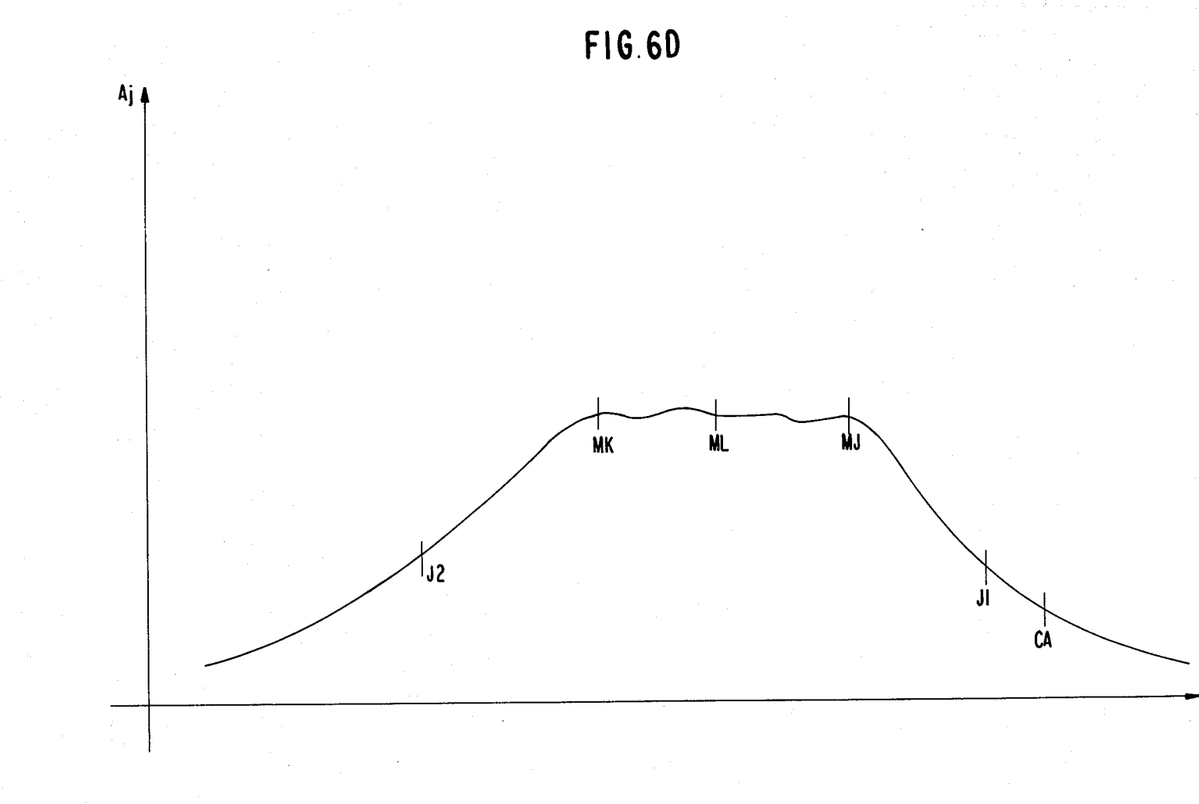
FIG. 6D illustrates the relation between frequency index J and detector output.

FIG. 6D is a simplified curve of a single sweep plotting Aj (the returned voltage from the detector 21) and the frequency index J. In this processing, J is decremented from J1 to J2. MX is the highest value of Aj found. MJ is the value of J at which MX is first encountered. MK is the value of J at which MX is last found (which may be equal to MJ). ML is the average (MJ+MK)/2. After a sweep, $J1=ML+48$ and $J2=ML-48$ unless:

$MK-J2<3$, then $J1=J2+16$; $J2=J1-96$, or
$J1-ML<3$, then $J2=J1-16$; $J1=J2+96$, or
$ML>CA$, then $J1=CA+8$; $J2=CA-88$, or
$MX<500$ or $OS<8$, then $J1=CA$; $J2=1$.

If $MX<500$ and $OS<8$, then OS is incremented by 8. If $MX>2000$ and $OS>7$, then OS is decremented by 8. OS is the amplification flag, if not less than 8 the high gain channel is used, Aj is amplified by 3, otherwise a unity gain channel is used.

A flow chart for the program used in the embodiment we actually constructed is shown in FIGS. 6A-6C.

Referring first to FIG. 6A, functions F2 and F4 initialize the processor including loading the program, initializing registers, storing the assembly program, and clearing arrays. Function F5 runs a test sweep throughout the entire range (in our embodiment frequencies indices 1 to 2047 corresponding to the entire frequency range of the VTO). The parameters displayed are the highest return amplitude from the detector 21 (MX) and the average of the indices over which that amplitude was returned (ML). Function F6 allows an operator input to initiate calibration. Assuming that calibration is desired, function F7 is performed which sweeps through a smaller frequency range (in our embodiment 64 indices centered about ML). The sweep is performed thirty times and a parameter ML is the frequency index at which the highest returned amplitude is found. A parameter Sm is the sum of the parameter ML over all thirty sweeps.

Function F8 then computes a number of parameters, CA is the average ML over the thirty sweeps and is considered the ice-free quiescent resonant frequency index. An ice trigger parameter IT is also computed, the parameters MX, CA are stored into the arrays and the parameters CA and IT are displayed on the panel display meters. Function F9, in our embodiment is then performed; however, in the absence of a CRT display, function F9 is not required. Function F10 allows the operator to request recalibration. Assuming recalibration is not effected, a loop of functions F9 to F11 is performed as long as the difference between CA and ML is less than the ice trigger IT. When that inequality is no longer satisfied, icing has been detected and processing skips through point B (FIG. 6B). Function F12 sounds an alarm and starts a timing clock. Function F13 sets up new parameters J1 and J2 (the limit within which the frequency index is swept) as a count of 96 centered on ML. Function F15 performs a single sweep and returns with four parameters, MX is the highest output amplitude of the detector 21 within the sweep, MK is the index value at which MX was last found, MJ is the index value at which MX is first detected, and ML is the average. This is effected by a subroutine PEAK, shown in more detail in FIG. 6C. Thereafter, function F16 is effected. The adjustments to J1, J2 and OS, based on comparisons between JK, J2; J1, ML; ML, CA; MX, 500; OS, 8; MX, 2000 and OS, 7 are as described above.

Functions F15, F16 are repeatedly performed until the clock, checked at F28 is expired. When the clock expires, function F30 computes the difference between the frequency index (ML) and the calibration index (CA). If DX is less than zero (determined at function F31), then function F32 is performed to change the sweep parameters. TH (ice thickness) is set to zero. On the other hand, if DX is greater than zero, then function F33 computes TH from DX.

The ice thickness TH is computed from DX based on the fifth order polynomial $\Sigma C_i DX^i$ where the coefficients are:

0.426986341
−0.00009568097
$3.50247865 \times 10^{-7}$
$-3.49928882 \times 10^{-10}$
$1.25803687 \times 10^{-13}$ respectively.

Thereafter, function F34 determines the time at which measurement was effected and stores the parameters MX, DX and TH in the array. Thus, as functions F15–F33 are repeatedly performed the array created by F34 retains more and more data. Smoothed ice thickness TT and rate TK are obtained from the six most-recent readings of TH and fitted to a least squares straight line. Thus, F39 checks to see if six or more entries have been accumulated. If so, F40 is checked to see if an initial fit has been obtained. If not, F42 is performed. On the other hand, if curve fitting has been effected, the F43 merely updates sums based on new data. In either event, F46 converts binary to decimal and displays. Thereafter, F41 again checks the timer to see if a reduced sampling rate can be effected by comparing elapsed time to a fixed quantity (e.g. 30 seconds). Depending on the outcome of the comparison, F45 may be effected. Thereafter, F44 checks to see if the array is full. If not, the loop is reentered. If so, printing of data is implemented.

In an installation which did not include a printer, once icing was detected, the loop of functions F15–F46 is continually performed to update the display of ice thickness and rate of growth of ice thickness.

The subroutine PEAK, referred to at function F15 (FIG. 6B) is shown in more detail in FIG. 6C. The subroutine is entered with the parameters J1 and J2. These parameters are determined, in the first pass at function F13, and in succeeding passes, at function F16. In any event, F15.1 moves the parameter J1 to the register J. Function F15.3 loads a suitably low quantity into a register MX. Function F15.4 outputs the parameter J (at this point equal to J1) and starts the analog-to-digital conversion. The resulting quantity is then compared with the quantity in MX. First, at function F15.5, if A is less than MX, processing skips to function F15.10 where the amplification flag is checked. Depending on the condition of the amplification flag, and on completion of the analog-to-digital conversion, either function F15.12 or function F15.14 stores the quantity A. Thereafter, function F15.15 decrements J and function F15.16 determines if J is less than J2. If it is, the subroutine loops back to function F15.4 and outputs the new parameter J and awaits the return signal.

On the other hand, the returned amplitude would normally be greater than MX, since the initial quantity is a low quantity. Thereafter, function F15.7 updates MX, and function F15.8 updates the register MJ with the present parameter J. Function F15.9 updates the register MK with the present parameter J and the OS flag is checked again at function F15.10.

This processing is continued until a parameter A is detected which is equal to MX. At that point, function F15.6 skips the processing to function F15.9. Skipping function F15.7 and F15.8 maintains previous quantity MX and previous quantity MJ. This is significant since these values will normally not be changed so long as the quantity A is either maintained level or decreases. In this fashion, the subroutine identified MJ as the first J parameter at which the largest return amplitude was detected, and MX as that amplitude.

This processing continues until function F15.5 determines that a return quantity A is less than MX. As a result, in addition to skipping functions F15.7 and F15.8, function F15.9 is also skipped, thereby retaining MK as the last parameter J at which the highest return value MX was detected.

This processing then continues until functions F15.17 determines that J is not less than J2. Thereafter, function F15.18 computes the average ML and that processing terminates and returns to function F16.

Reference again to FIG. 6D illustrates the expected relation between the quantitites J1, J2, MJ, MK and ML.

A review of FIGS. 6B and 6C indicates that function F15 and particularly function F15.4 outputs a sequence of frequency indices to sweep the VTO 29 in frequency within a predetermined range (J1 to J2). The functions F15.5 through F15.9 assist in locating the returned peak (i.e. MJ and MK) and isolate the peak digital signal MX. Function F15.18 in determining ML, in conjunction with function F16, in determining J1 and J2, determine the predetermined frequency range which will be swept. Finally, F33 converts the frequency index difference DX into an ice thickness signal TH. As explained, TH is smoothed by functions F39–F42 to derive smoothed ice thickness TT and ice rate signal TK.

Those of oridinary skill in the art will understand that the invention may be used in conjunction with a conventional de-icer, which for example can be turned on or initiated once the invention indicates substantial ice accretion. After a period of operation of the de-icer, of course, the ice will be removed. In that event, the functions F31, for example, will indicate lack of ice. At that point, the program can be returned to the loop of functions F10 and F11 to await further icing, in a manner that should be apparent to those skilled in the art.

We claim:

1. An ice detector and thickness measurement system comprising:
   a controlled oscillator,
   a shorted surface waveguide coupled to said controlled oscillator at a feed point with a short located a fixed distance from said feed point, means to mount said waveguide in a location subject to ice accretion, detector means coupled to said surface wave guide at a point displaced from said feed point and responsive to electrical energy incident at said detector means for indicating electrical energy incident thereon, measurement means coupled to said controlled oscillator for indicating frequency deviation of said controlled oscillator from a predetermined frequency, and control means to control a frequency of oscillation of said controlled oscillator, whereby ice thickness is detected by noting said frequency deviation of said measurement means when said control means controls said frequency of oscillation to produce a maximum detected energy at said detector means.

2. The apparatus of claim 1 in which said control means includes:

feedback means responsive to said detector means for varying said frequency of oscillation to automatically determine a frequency of oscillation producing a maximum of detected energy by said detector means.

3. The apparatus of claim 2 in which said measurement means, said control means and said feedback means comprise a microprocessor with an output port and an input port, a digital-to-analog converter coupled between said output port and said controlled oscillator, an analog-to-digital converter coupled between said detector means and said input port, and wherein said microprocessor includes:

frequency sweeping means to provide at said output port, digital signals to sweep said controlled oscillator through a predetermined frequency range, peak following means responsive to signals at said input port to isolate a peak digital signal and to determine said predetermined frequency range, and conversion means to develop an ice thickness signal from said peak digital signal.

4. The apparatus to claim 1 wherein:

said controlled oscillator is a voltage-tuned oscillator and wherein said measurement means and said control means comprise a microprocessor with output and input ports, an analog-to-digital converter coupled between said detector means and said input port, a digital-to-analog converter and an amplifier serially connected between said output port and said voltage-tuned oscillator, and wherein:

said microprocessor includes:

means responsive to signals at said input port to isolate a peak digital signal, and conversion means for converting said peak digital signal to an ice thickness signal.

5. The apparatus of claim 1 wherein:

said shorted surface waveguide is a dielectric trough line with a dielectric constant near to a dielectric constant of ice.

6. The apparatus of claim 5 in which said trough line is polyethylene of a length resonant at said predetermined frequency.

7. The apparatus of claim 6 in which said feed point is located one-fourth wavelength from an end of said trough line.

8. The apparatus of claim 7 wherein said trough line has a depth h and therein said feed point is located a distance d below said waveguide surface wherein a ratio d/h provides light coupling in a TE1 mode.

* * * * *